(12) United States Patent
Schiller et al.

(10) Patent No.: US 7,450,819 B1
(45) Date of Patent: Nov. 11, 2008

(54) METHOD FOR ADDRESSING A BITSTREAM RECORDING

(75) Inventors: Harald Schiller, Hannover (DE); Heinz-Werner Keesen, Hannover (DE); Marco Winter, Hannover (DE)

(73) Assignee: Thomson Licensing, Boulogne Billancourt (FR)

( * ) Notice: Subject to any disclaimer, the term of this patent is extended or adjusted under 35 U.S.C. 154(b) by 0 days.

(21) Appl. No.: 09/786,185

(22) PCT Filed: Aug. 26, 1999

(86) PCT No.: PCT/EP99/06254

§ 371 (c)(1), (2), (4) Date: Mar. 1, 2001

(87) PCT Pub. No.: WO00/14743

PCT Pub. Date: Mar. 16, 2000

(30) Foreign Application Priority Data

Sep. 7, 1998 (EP) .................................. 98250315
Nov. 4, 1998 (EP) .................................. 98250387

(51) Int. Cl.
*H04N 5/91* (2006.01)
*H04N 7/04* (2006.01)

(52) U.S. Cl. ........................... 386/95; 386/46; 386/95; 386/98; 386/125; 386/126; 386/104; 386/106

(58) Field of Classification Search .................. 386/126, 386/95, 125, 15, 78, 26, 64, 69, 46, 98, 104, 386/105, 112, 65
See application file for complete search history.

(56) References Cited

U.S. PATENT DOCUMENTS 5,630,005 A * 5/1997 Ort ............................. 386/69

5,745,451 A 4/1998 Mukawa et al.
6,556,772 B1 * 4/2003 Ando et al. ................... 386/95
6,566,772 B2 * 5/2003 Yamaguchi .................. 310/81

FOREIGN PATENT DOCUMENTS

| EP | 0673034 | 9/1995 |
|---|---|---|
| EP | 0729153 | 8/1996 |
| EP | 0797204 | 9/1997 |
| FR | 2759471 | 8/1998 |

OTHER PUBLICATIONS

Hungarian Search Report Search Report dated Mar. 18, 2003 attached.

* cited by examiner

*Primary Examiner*—John W. Miller
*Assistant Examiner*—Jamie Vent
(74) *Attorney, Agent, or Firm*—Joseph J. Laks; Paul P. Kiel

(57) ABSTRACT

In bitstream recording presentation data is organized into Video Object Units. These have a variable size but have also a variable duration. To allow access to any Video Object Unit in the bitstream a housekeeping address table is used which is based on pieces of the bitstream of constant size per piece. The address table additionally contains for each of these pieces a specific delta duration which indicates the time difference between the arrival time of the first packet of a piece and the arrival time of the packet following immediately the last packet of that piece. The computation of the target VOBU address includes the following steps:

Figure 1:
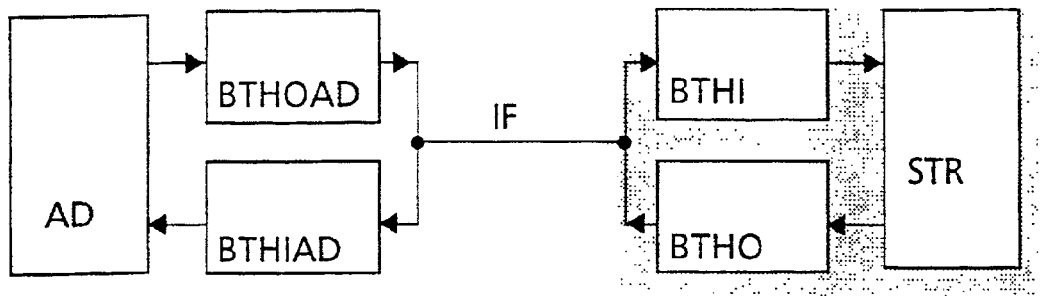

accumulate the delta durations until the given time value is most closely reached towards the target VOBU;

the running index of this table entry multiplied by the constant piece size directly results in the address value to be accessed.

7 Claims, 3 Drawing Sheets

| VOBU#n | Δ DUR#n |
|---|---|
|  |  |
| VOBU#i | Δ DUR#i |
|  |  |
| VOBU#3 | Δ DUR#3 |
| VOBU#2 | Δ DUR#2 |
| VOBU#1 | Δ DUR#1 |

DAV →

|  | Contents | Number of Bytes |
|---|---|---|
| (1) MAPU_SZ | Mapping Unit Size | 2 |
| (2) MTU_SHFT | Mapping Time Unit Shift | 1 |
| (3) reserved | reserved | 1 |
| (4) MAPL_ENT_Ns | Number of Mapping List Entries | 4 |
| (5) S_S_APAT | Stream Start APAT | 8 |
| (6) S_E_APAT | Stream End APAT | 8 |
|  | Total | 24 |

METHOD FOR ADDRESSING A BITSTREAM RECORDING

This application claims the benefit under 35 U.S.C. § 365 of International Application PCT/EP99/06254, filed Aug. 26, 1999, which was published in accordance with PCT Article 21(2) on Mar. 16, 2000, in English, and which claims the benefit of European Application No. 98250315.3, filed Sep. 7, 1998 and European Application No. 98250387.2, filed Nov. 4, 1998.

BACKGROUND

In bitstream recording one is free to subdivide the bitstream into sub-units of more regular structure. Presentation data in DVDs (digital video or versatile disc) is organised into units called Video Object Unit, denoted VOBU, e.g. in the RTRW Specification for Realtime Rewritable Video DVDs. VOBUs have a variable size (data amount measured in number of sectors), but have also a variable duration (measured in number of video fields).

For data retrieval from the disc the RTRW specification foresees a 'VOBU map' which is a table where for every VOBU in a recording the length in sectors and the duration in fields is entered.

EP-A-0 729 153 discloses a table that is used for trick play mode, in which table a time code is assigned to each sector on an optical disc suited for variable transfer rate.

INVENTION

A table for data retrieval from a storage medium can be based on bitstream data being subdivided into pieces of constant duration. 'Duration' means the difference between the arrival time of the first packet of a piece and the arrival time of the packet following immediately the last packet of that piece.

'Housekeeping' in the general context of either RTRW recording or Stream recording is the task to translate a given time value (presentation time in case of RTRW recording or packet arrival time in case of Stream recording) into a disc address value where the desired data can be found.

In such systems the VOBU map or 'housekeeping address table', denoted HAT, can contain a specific size or a specific offset or a specific delta size or, in general, a specific address-like quantity for each of these constant-duration pieces. By storing delta values instead of the total duration at a current VOBU these entries can be described with shorter word length which helps to keep the total VOBU map in a reasonable size.

A possible type of housekeeping process for these systems could include the following steps:
By division and truncation, calculate from the given time value the index of the table entry to be looked up.
The content of the table entry either directly specifies the address value to access, or all table entries up to that index have to be accumulated to get the address value to be accessed.

The big disadvantage of such type of HAT which is based on constant-duration pieces lies in the following:
In case of a low bitrate recording the pieces of constant duration will be small in size, i.e. every piece will comprise a few data sectors only or, in the extreme, a fraction of a data sector only. The disc can contain enormous numbers of those pieces, so that the HAT may become too big to be kept in the memory.
In case of high bitrate recording, the pieces of constant duration are big in size, i.e. each piece will comprise many data sectors. Then, addressing one piece or another corresponds to a very coarse addressing on the (sector) scale, i.e. a piece address derived from the HAT can be located many sectors away from the currently desired location.

Therefore housekeeping based on constant-duration pieces can result in a too big HAT in some cases (up to one half of the disc capacity), and can result in too coarse addressing in other cases.

It is one object of the invention to disclose a method for assigning to a given time value a storage medium address value which method avoids such disadvantages. This object is achieved by the method disclosed in claim 1.

According to the invention the housekeeping address table HAT is based on pieces of constant length or size, i.e. a constant number of bits per piece.

In a medium like DVD-RAM where data are physically organised into 'ECC blocks' (ECC: error correction code) of 32 kByte length each, particular advantages result if the above constant size or a multiple of it is used as the constant size of a piece. However, any other constant size can be used. In this case of pieces of constant size the HAT contains for each of these pieces of constant size a specific absolute duration or, preferably, a specific delta duration which indicates the arrival time difference between the last and the first packet contained in a piece.

The housekeeping process, i.e. the computation of the target VOBU address includes the following steps:
Accumulate the delta durations contained in the HAT until the given time value is most closely reached towards the target VOBU, i.e. until the sum of delta durations is less than or equal to the given time value assuming that forward scanning of the VOBU entries is performed, or until the sum of delta durations is greater than or equal to the given time value assuming that backward scanning of the VOBU entries is performed.
The running index of this table entry multiplied by the constant piece size directly results in the address value to be accessed.

The advantages of the inventive constant-size based HAT are:
the HAT size does not depend on the bitrate of the recordings,
the HAT addressing accuracy is constant, the granularity basically corresponds to the 'piece size constant' which can be chosen as appropriate to be constant for all types of discs, to be constant per disc, or to be constant per recording on a specific disc.

In principle, the inventive method is suited for addressing a bitstream to be recorded or being recorded on a storage medium, e.g. a DVD recorder, wherein an address table is used that is based on pieces of said bitstream, and wherein:
said pieces each include a constant amount of bits of said bitstream;
to each address table entry for said pieces an absolute time duration or a delta time duration is assigned in said address table using a running index;
in case of absolute time duration values storage: in order to get an address value for reaching a target address the nearest corresponding absolute time duration entry of said address table is selected and the corresponding running index becomes multiplied by said constant amount in order to compute said address value, or,
in case of delta time duration values storage: in order to get an address value for reaching a target address all delta time durations up to the nearest time duration corresponding to said address value become accumulated and the running index corresponding to the delta time duration entry related to said nearest time duration becomes multiplied by said constant amount in order to compute said address value.

Advantageous additional embodiments of the inventive method are disclosed in the respective dependent claims.

DRAWINGS

Figure 2:
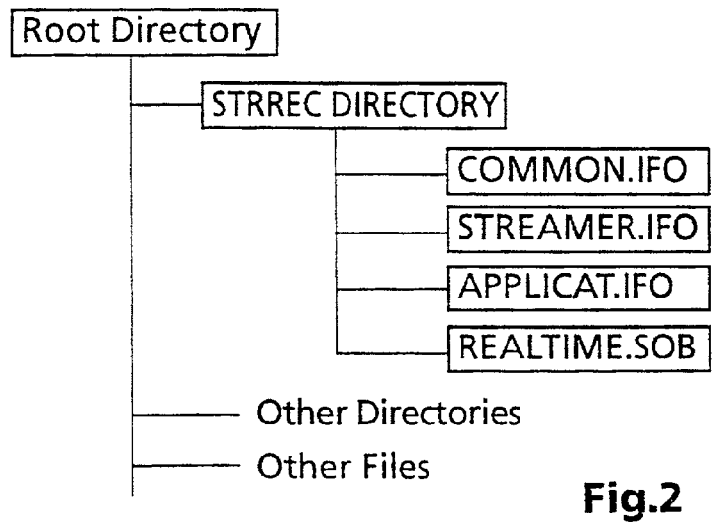
Figure 3:
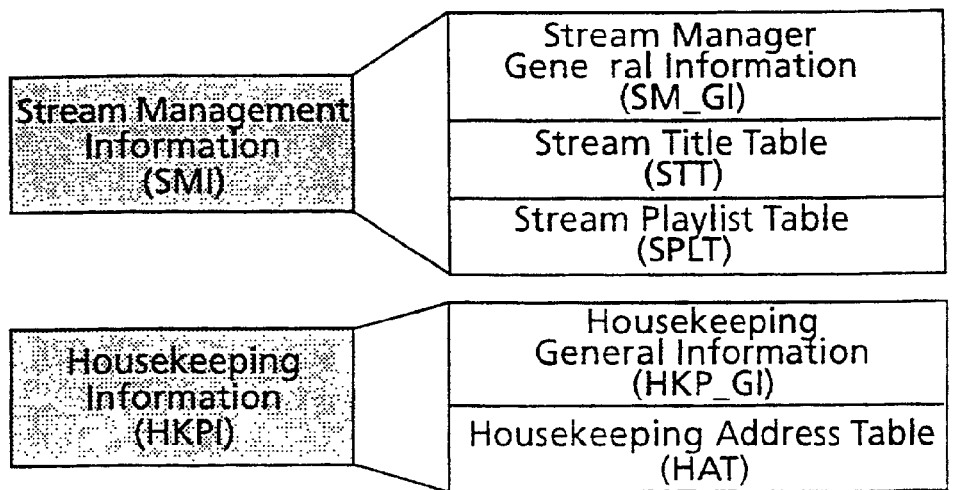
Figures 4, 5, 6:
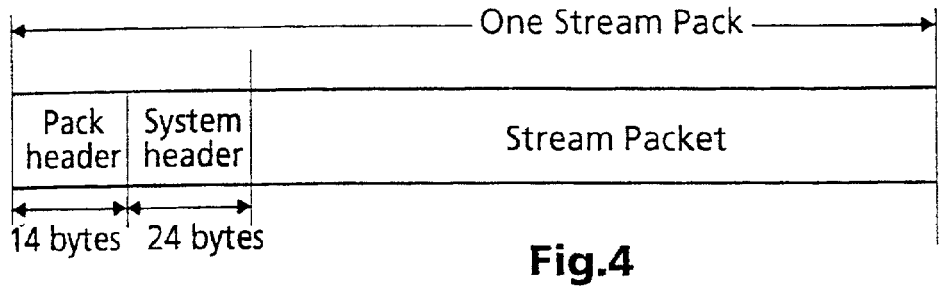
Figure 7:
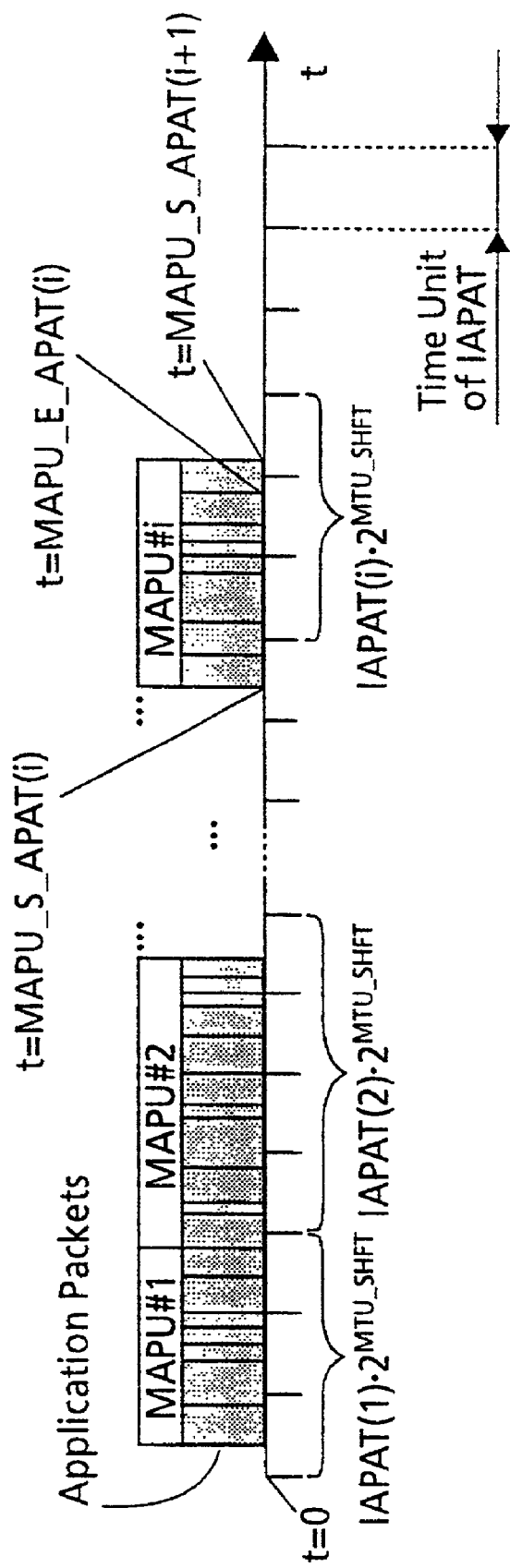

Embodiments of the invention are described with reference to the accompanying drawings, which show in:

FIG. 1 simplified overall system for DVD Stream Recording;
FIG. 2 basic directory and file structure;
FIG. 3 navigation data structure;
FIG. 4 stream pack;
FIG. 5 inventive housekeeping address table;
FIG. 6 Stream Time Map Information;
FIG. 7 mapping list example.

EXEMPLARY EMBODIMENTS

The DVD Stream Recording system is designed to use rewritable DVD discs for recording existing digital bitstreams, editing them and playing them back as bitstreams.

The following abbreviations are used:

LB: Logical Block, RBN: relative byte number, RBP: relative byte position, RLBN: relative logical block number, STB: set top box, TOC: table of content, SCR: system clock reference.

This system is designed to satisfy the following requirements:

Any packet size is supported as long as it is less than 2 kByte and of constant length within a take.

A timing mechanism, i.e. a time stamp is added to every broadcast packet to enable proper packet delivery during playback.

To enlarge the fields of applications, non-real-time recording should be possible. However, in this case the STB has to generate the Time Stamp information.

Data allocation strategy and file support real-time stream recording.

Many digital services require Service Information which normally is embedded in the real-time stream. To support a STB fed by data from a DVD player, the DVD should provide additional space, which can be used by the STB to duplicate part of the service information and to add additional TOC information.

Copy Protection must be supported. In addition, any scrambling performed by the service provider or the STB must be kept unchanged.

User requirements can be grouped into requirements for recording, requirements for playback, and requirements for editing:

Real-time Recording

The system should be designed to enable real-time recording of digital streams. It also should allow the user to concatenate recordings, even if those recordings consist of different stream formats. If recordings are concatenated, a seamless or close to seamless playback possibility would be nice but is not required.

Navigation Support

To support navigation two pieces of information (lists) should be generated during recording:

1) An 'original' version of a play list. This list contains quite low level information, e.g. time map or (broadcast) packet order of the recording. This list is accessible by the STB and the content is understood by the DVD streamer as well as by the STB. In its original version the playlist enables the playback of a complete recording. The playlist may be accessed and extended after recording by the STB to allow more sophisticated playback sequences.

2) The second piece of information, a mapping list, is generated to support the stream recorder to retrieve packet stream chunks (cells), that are described in terms of the application domain, e.g. 'broadcast packets' or 'time'. This list is owned and understood by the DVD streamer only.

Content Description

The system should reserve space which can be used by the STB to store high level TOC and Service Information. This information is provided for the user to navigate through the content stored on disc and may contain sophisticated GUI information. The content needs not to be understood by the stream recorder. However a common subset of the TOC information, e.g. based on a character string, may be useful to be shared between STB and DVD, in order to enable the stream recorder to provide a basic menu by itself.

Playback of individual recording and playing all recordings sequentially should be possible via play list.

Player Menus for Entry Point Selection

The STB can generate a sophisticated menu based on the TOC information stored on the disc. However, it should be possible to generate a simple menu by the streamer itself, e.g. via some 'character' information which is shared by STB and DVD.

Trick Play Modes

The STB should be able to steer trick play via the 'play list'. Due to the nature of the broadcast stream, the trick play features may be limited to basic ones, e.g. Time Search and Title Jump.

User defined playback sequence features like programming or parental control can be supported via the play list The DVD streamer should create the 'original version' of the play list. It also should allow extensions and modifications of the play list by the STB for more sophisticated playback features. The DVD streamer is not responsible for the content of those sophisticated playlist(s).

The system must support the deletion of single recordings on user's request. If possible, the system should allow this feature under the control of the STB.

The system may support insert editing.

In the simplified overall system of FIG. 1 an application device AD interacts via an interface IF, e.g. an IEEE1394 interface, with a streamer device STRD, i.e. a DVD recorder. A streamer STR within STRD sends its data via output buffering & timestamping handling means BTHO to IF and receives from IF data via input buffering & timestamping handling means BTHI. AD sends its data via output buffering & time-stamping handling means BTHOAD to IF and receives from IF data via input buffering & timestamping handling means BTHIAD.

Concerning the directory and file structure, the organisation of Stream Data and Navigation Data of DVD Stream Recording is done in a specific way such as to take into account the following:

Any DVD Streamer device STRD has certain requirements to store its own housekeeping data or Streamer-specific navigation data on the disc. These data are solely for helping the retrieval of recorded data; they need not be understood or even be visible to any outside application device AD.

Any DVD Streamer device STRD needs to communicate with the application device AD it is connected to. This communication should be as universal as possible so that the maximum possible range of applications can be connected to the Streamer. The Navigation Data to support such communication are called Common navigation data and must be understandable by the Streamer as well as by the application device.

The Streamer device STRD should offer to the connected application device AD a means for storing its own private data of any desired kind. The Streamer needs not to understand any of the content, internal structure, or meaning of this Application-specific navigation data.

FIG. 2 illustrates a possible directory and file structure where all the data comprising the disc content are. The files storing the disc content are placed under the STRREC directory which is under the root directory. Under the STRREC directory the following files are created:

COMMON.IFO

Basic information to describe the stream content. Needs to be understood by the Application Device as well as the Streamer.

STREAMER.IFO

Private housekeeping information specific to the Streamer Device. Needs not to be understood by the Application Device.

APPLICAT.IFO

Application Private Data, i.e. information that is specific to the Application(s) connected to the Streamer. Needs not to be understood by the Streamer.

REALTIME.SOB

Recorded real-time stream data proper.

Note that except for the files described above, the STRREC directory shall not contain any other files or directories.

Concerning the navigation data structure, Navigation data is provided to control the recording, playing back, and editing of any bitstreams that are recorded. As shown in FIG. 3, Navigation Data includes Stream Management Information (SMI) as contained in the file named COMMON.IFO and Housekeeping Information (HKPI) as contained in the file named STREAMER.IFO. From the point of view of the Streamer Device, these two kinds of information are sufficient to perform all necessary operations.

In addition to these, DVD Stream Recording also foresees the possibility of reserving a storage location for Application Private Data (APD), which may in general also be considered as Navigation Data.

SMI and HKPI are the Navigation Data which are directly relevant for the Streamer operation. SMI includes three kinds of information tables, namely Stream Manager General Information (SM_GI), Stream Title Table (STT), and Stream Playlist Table (SPLT), in this order. HKPI includes two kinds of information tables, namely Housekeeping General Information (HKP_GI) and Housekeeping Address Table (HAT), in this order.

There is no restriction in Stream Recording that each table within Navigation Information must be aligned with a sector boundary.

SM_GI includes information items like end address of SMI, end address of SM_GI, start address of STT and start address of SPLT.

STT includes information items like Number of Stream Titles, End Address of Stream Title Table, Application Packet Size, Service ID, Application Device ID, Stream Duration, Stream Name Search Pointer, Stream Title Names (STN). SPLT includes information items like Number of Playlists, End address of SPLT, Start Addresses of Playlist Information, Number of Playlist Entries, Index of Stream Title, Start SCR, and End SCR.

Housekeeping General Information (HKP_GI) includes information items like Number of Housekeeping Address Entries (HAE_Ns), End address of HKPI (HKPI_EA) and Time Scale Factor (HKP_TSCAL).

HAE_Ns describes the number of housekeeping address entries contained in this HKPI. HKPI_EA describes the End Address of this HKPI. HKP_TSCAL describes the time scaling used within this HKPI.

The purpose of the inventive Housekeeping Address Table (HAT) is to provide all necessary information so that given playlist entries are efficiently translated into disc address pairs, and viceversa.

It is also possible to include Application Private Data which consist of three kinds of information, namely Application Private Data General Information, a set of one or more Application Private Data Search Pointers, and a set of one or more Application Private Data Area. If any Application Private Data exists, these three kinds of information become recorded and stored in this order in the APPLICAT.IFO file.

Stream Data include one or more 'Stream Objects' (SOBs) which each can be stored as a 'Program stream' as described in ISO/IEC 13818-1, Systems.

A SOB can be terminated by a program_end_code. The value of the SCR field in the first pack of each SOB may be non-zero. A SOB contains the Stream Data packed into a sequence of 'Stream Packs' (S_PCKs). Stream data can be organised as one elementary stream and are carried in PES packets with a stream id.

As shown in FIG. 4 a Stream Pack includes a pack header, eventually followed by a system header, and followed by one Stream Packet (S_PKT). A system header may be included in those S_PCKs which are the first S_PCK of a SOB. When a system header is included, the length of the remaining Stream Pack content is 2010 bytes, when it is not included, the length of Stream Pack content is 2034 bytes.

A stream Object is composed of one or more Stream Packs.

The HAT table depicted in FIG. 5 contains for each piece or VOBU (VOBU#1 to VOBU#n) of the bitstream to be recorded or of the recorded bitstream a corresponding absolute or delta time duration entry ΔDUR#1 to ΔDUR#n. DAV denotes a desired address or target address in the bitstream. VOBU#1 to VOBU#n each concern a constant number of bits of the bitstream.

The HAT table can have the format of a Stream Time Map Information STMAPI and may include two sub-units: "Stream Time Map General Information" STMAP_GI and one "Mapping List" MAPL. A possible content of STMAPI is shown in FIG. 6. MAPU_SZ describes the size in sectors of the mapping list units. A Mapping Unit Size of e.g. 16 sectors means that the first Mapping List Entry relates to the application packets contained in the first 16 sectors of the Stream, the second Mapping List Entry relates to the application packets contained in the next 16 sectors, and so on. MTU_SHFT describes the weight of the LSB of the mapping list entries, relative to the bits of the Packet Arrival Time (PAT) Describing Format. MTU_SHFT describes a value between 16 and 36. A value of e.g. "16" means that the LSB of Incremental Application Packet Arrival Time IAPAT has the same weight as PAT_base[0], whereby PAT_base[x] means a PAT_base value measured by 90 kHz units.

MTU_SHFT depends on MAPU_SZ. MTU_SHFT fulfils the rules:

$$0 \leq 5625 \cdot 2^{34} \cdot \frac{MAPU\_SZ}{2^{MTU\_SHFT} \cdot max\_bitrate} - 1 < 1$$

and $$16 \leq MTU\_SHFT \leq 36$$

wherein max_bitrate=maximum bitrate of the MPEG-2 Program Stream.

MAPL_ENT_Ns describes the number of Mapping List Entries to follow after STMAP_GI.

S_S_APAT describes the start Application Packet Arrival Time of the Stream, i.e. the packet arrival time of the first packet belonging to the Stream.

S_E_APAT describes the end Application Packet Arrival Time of the Stream, i.e. the packet arrival time of the last packet belonging to the Stream.

The Mapping List MAPL consists of zero or more "Incremental Application Packet Arrival Times" IAPAT. IAPAT describes the Incremental Application Packet Arrival Time of the corresponding Mapping Unit in DVD Stream Recording's Incremental PAT Describing Format defined in the following:

Let MAPU_S_APAT(i), $1 \leq i \leq$ MAPL_ENT_Ns, be the start Application Packet Arrival Time of the Mapping Unit #i, i.e. the packet arrival time of the first packet belonging to the Mapping Unit #i; let MAPU_E_APAT(i) be the last Application Packet Arrival Time of the Mapping Unit #i, i.e. the packet arrival time of the last packet belonging to the Mapping Unit #i and let IAPAT(i) be the i-th IAPAT entry of the Mapping List, i.e. IAPAT(L) is the first entry of the Mapping List. Then IAPAT(i) shall fulfil the rules:

$$0 \leq \left[\sum_{k=1}^{i} IAPAT(k)\right] - \frac{MAPU\_S\_APAT(i+1)}{2^{MTU\_SHFT}} < 1$$

for i=1,2, . . . , MAPL_ENT Ns-1, and $$0 < \left[\sum_{k=1}^{i} IAPAT(k)\right] - \frac{MAPU\_E\_APAT(i)}{2^{MTU\_SHFT}} \leq 1$$

for i=MAPL_ENT_Ns, and $$0 \leq IAPAT(i) < 2^{12}$$

for i=1,2, . . . , MAPL_ENT_Ns

FIG. 7 shows an example of the order of MAPU, MAPU_S_APAT, MAPU_E_APAT and IAPAT. The lower side of the t-axis is divided in IAPAT Time Units and the upper side of the t-axis in the MAPUs.

MAPU_S_APAT(i) and MAPU_E_APAT(i) are described in the DVD Stream Recording's PAT Describing Format. For the comparison in the equation above MAPU_S_APAT(i) and MAPU_E_APAT(i) are treated as e.g. 6 byte unsigned integer values.

The duration of IAPAT=1 is the $$\text{Time Unit of } IAPAT = \frac{2^{MTU\_SHIFT}}{5625 \cdot 2^{20}} \text{ seconds.}$$

In Stream recording, the application performs its own padding, so that the pack length adjustment methods of DVD-ROM Video or RTRW need not to be used. In Stream recording it is safe to assume, that the Stream packets will always have the necessary length.

The data stream also contains time stamps, e.g. within the data packets.

What is claimed is:

1. Method for addressing pieces of a bitstream to be recorded or being recorded on a storage medium, wherein an address table is used that assigns time information to said pieces and each of said pieces including a constant number of bits, wherein:

said pieces contain data packets;

to each address table entry for said pieces a delta time duration value is assigned in said address table and to each delta time duration value a running index is assigned, wherein a delta time duration value represents the difference between the arrival time of the first data packet of a piece and the arrival time of the data packet following immediately the last data packet of that piece;

in order to get the value for a target piece address on said storage medium, all delta time duration values up to the nearest time duration value for the piece having said target address become accumulated and the corresponding running index for the delta time duration entry related to said nearest time duration value is multiplied by said constant bit number in order to compute said target piece address value.

2. Method according to claim 1, wherein said storage medium is one of a Streamer device and a DVD recorder.

3. Method according to claim 1, wherein the size of a piece corresponds to the number of bits of an ECC block or a multiple thereof.

4. Computer readable storage medium containing pieces of a bitstream and an address table that assigns time information to said pieces, each of said pieces including a constant number of bits, and;

said pieces contain data packets;

each address table entry for said pieces having assigned a delta time duration value in said address table and each delta time duration value having assigned a running index, a delta time duration value representing difference between an arrival time of a first data packet of a piece and an arrival time of a data packet following immediately a last data packet of the piece, all delta time duration values up to the nearest time duration value for the piece having said target address being accumulated and a corresponding running index for a delta time duration entry related to said nearest time duration value is multiplied by said constant bit number in order to compute a target piece address value on said storage medium.

5. Device for recording a bitstream on a storage medium or for replaying a bitstream from a storage medium, wherein for addressing pieces of said bitstream an address table is used that assigns time information to said pieces, and wherein each of said pieces includes a constant number of bits arranged in data packets, said device including:

a memory storing an address table, wherein to each address table entry a delta time duration value is assigned and to each delta time duration value a running index is assigned, and wherein a delta time duration value represents the difference between the arrival time of the first data packet of a piece and the arrival time of the data packet following immediately the last data packet of that piece;

means for calculating the value for a target piece address on said storage medium, wherein all delta time duration values up to the nearest time duration value for the piece having said target address become accumulated and the corresponding running index for the delta time duration entry related to said nearest time duration value is multiplied by said constant bit number in order to compute said target piece address value.

6. Device according to claim 5, said device being one of a Streamer device and a DVD recorder.

7. Device according to claim 5, wherein the size of a piece corresponds to the number of bits of an ECC block or a multiple thereof.

* * * * *